July 7, 1925.
C. C. HANSEN
1,545,050
CLUTCH FOR HOISTS
Filed June 3, 1924
2 Sheets-Sheet 1
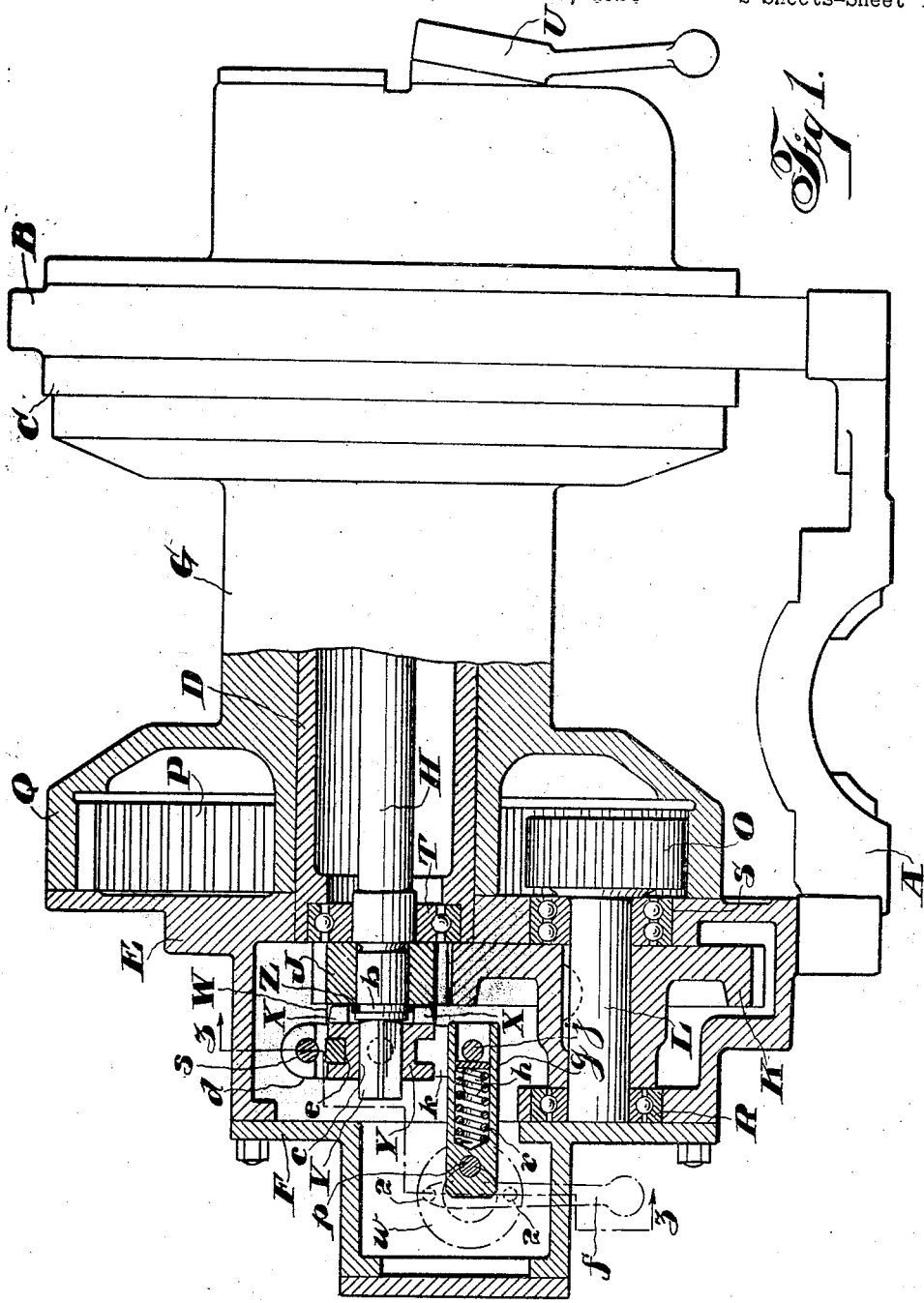
INVENTOR
Charles C. Hansen
BY
Herbert B. Ogden
HIS ATTORNEY July 7, 1925.
C. C. HANSEN
CLUTCH FOR HOISTS
Filed June 3, 1924 2 Sheets-Sheet 2
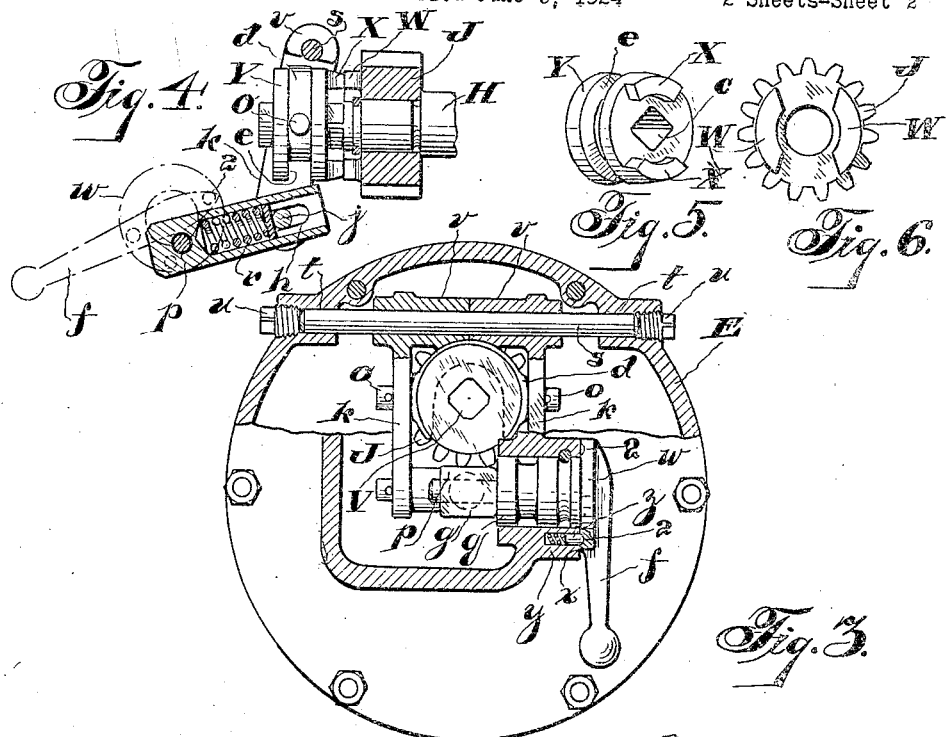
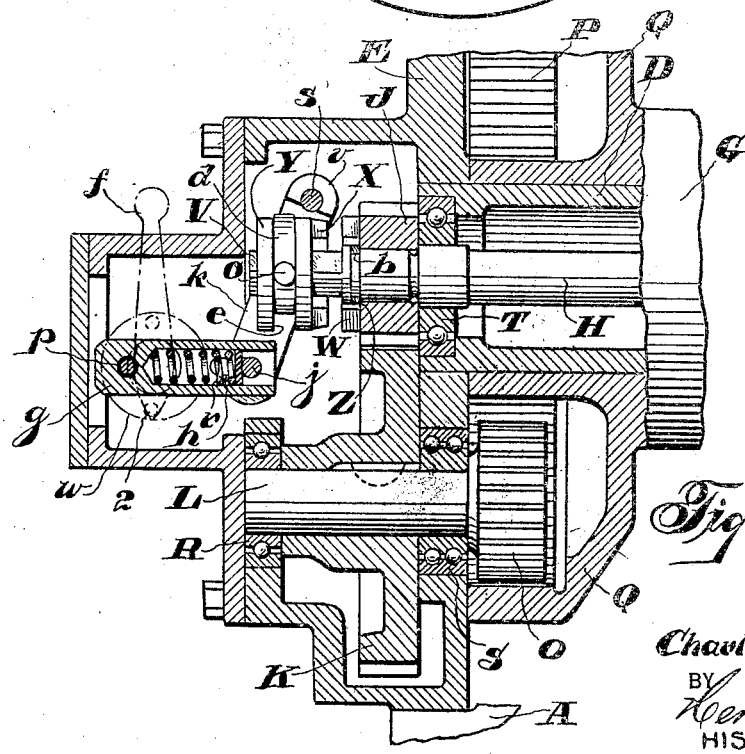
INVENTOR
Charles C. Hansen
BY
Herbert R. Ogden
HIS ATTORNEY Patented July 7, 1925.

1,545,050

UNITED STATES PATENT OFFICE.

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY.

CLUTCH FOR HOISTS.

Application filed June 3, 1924. Serial No. 717,664.

*To all whom it may concern:*

Be it known that I, CHARLES C. HANSEN, a citizen of the United States, a resident of Easton, county of Northampton, and State of Pennsylvania, have invented a certain Clutch for Hoists, of which the following is a specification accompanied by drawings.

This invention relates to hoists, and more particularly to a clutch mechanism for connecting and disconnecting the power driving mechanism with the rope drum.

When hoists are provided with jaw clutches for connecting and disconnecting the source of power with the rope drums, operators are often careless about operating the clutch and manipulate the operating levers in such a manner that the clutch teeth break off or are damaged because the clutch members are not forced properly into engagement. Slowness and failure to use sufficient force to push the clutch members into engagement causes the teeth to engage only at the ends and, when the motor or load cause jerking, the clutch teeth suffer damage.

It is an object of this invention to avoid undue wear of the clutch members by enabling the operator to place the operating lever controlling the clutch in such a position that the clutch teeth automatically engage quickly and positively.

Other objects and advantages will be in part obvious and in part pointed out hereinafter in the following description taken in conjunction with the drawing which illustrates one form which the invention may assume in practice.

Figure 1 is a side elevation partly in section showing the clutch operating mechanism constructed in accordance with the practice of the invention and applied to a form of single drum hoist;

Figure 2 is a vertical longitudinal section of a portion of the hoist showing the clutch mechanism in its disengaged position;

Figure 3 is a cross section of the clutch mechanism taken along the line 3—3 of Fig. 1 looking in the direction of the arrows;

Figure 4 is a side view of the clutch mechanism showing the clutch members in position ready to automatically engage upon rotation of the drive shaft;

Figure 5 is a perspective view of one of the clutch members which is adapted to be moved into and out of engagement with a relatively stationary clutch member; and Figure 6 is a view of the face of the relatively stationary clutch member.

Referring to the drawings, the hoist includes a base A supporting at one end a housing B for a suitable motor such as for instance, a fluid actuated motor of the flat or square piston type. A flange C formed integrally with a center bearing D is attached to the motor housing B extending to the opposite end of the base A and is attached to a gear case E supporting the end of the center bearing D, having a gear case cover F enclosing the clutch assembly. A rope drum G is rotatably mounted on the center bearing D and is driven by the motor through the driving shaft H, a clutch (described in detail hereinafter), driving pinion J, intermediate gear K, keyed to the intermediate gear shaft L, the intermediate pinion O and the internal gear P formed on the flange Q of the drum G. The intermediate gear shaft L is provided with anti-friction bearings R and S in the gear case E. A bearing T for the driving shaft H is provided in the center bearing D. For controlling the motor (not shown), within the housing B there is provided a suitable throttle valve lever U.

The clutch assembly includes two relatively movable clutch members, one of which may be formed integrally with the pinion J shown in Figure 6, and the other shown in Figure 5, being slidable on the square end V of the drive shaft H. To this end the pinion J is provided with jaws formed by projecting teeth W on its outer face adapted to engage with projecting teeth X forming jaws on the inner face of the sliding clutch member Y. Normally, the driving pinion J is rotatable on the drive shaft H, but is held against longitudinal movement by a ring Z fitting in an annular groove *b* in the shaft H.

The sliding clutch member Y is provided with a square hole *c* to cooperate with the square end V of the driving shaft H to prevent relative rotation between the said sliding clutch member and drive shaft. Sliding of the clutch member Y is controlled by a yoke *d* which fits loosely in an annular groove *e* in the periphery of the clutch member Y. A manually operable lever *f* controls the movement of the clutch member Y.

Preferably, the two clutch members should slide quickly into engagement to avoid clashing. By this invention there is provided a spring connection between the yoke $d$ and the manually operable lever $f$. By this spring connection, the operator may turn the lever $f$ to its full engaging position, and, although the clutch teeth W and X may not be in the position to engage immediately, however, the spring connection will effect the engagement as soon as clutch members J and Y have rotated with respect to each other to bring the clutch teeth W and X into mutual engaging position. The spring connection includes a link $g$ arranged to permit limited movement by means of an elongated slot $h$ engaging a pin $j$ in a pair of levers $k$, and operatively connected trunnions $o$ on the yoke $d$. The other end of the link $g$ is connected with the lever $f$ by means of a pin $p$ eccentrically mounted on the hub bearing $q$ of the manually operable lever $f$. A spring $r$, preferably mounted within the link $g$, which for this purpose is made hollow, normally opposes such relative limited movement between the levers $k$ and the manually operable lever $f$ so that when the latter lever is in the clutch engaging position, the spring $r$ tends to press the clutch member Y into engagement with the clutch teeth W on the pinion J as shown in Figure 4.

The pair of levers $k$ are pivotally mounted at one end on a spindle or shaft $s$ held in place in the apertures $t$ in the gear case E by means of pipe plugs $u$. The end of each of the levers $k$ is preferably provided with bosses $v$ to give the proper spacing between the levers $k$.

The manually operable lever $f$ for controlling the clutch is provided with a disc $w$, which is adapted to bear against a face $x$ on the boss $y$ in which the hub $q$ of the lever $f$ is adapted to turn. For the purpose of holding the lever $f$ in its clutch engaged and clutch disengaged position, there is provided a spring pressed plunger $z$ which is adapted to fit into indentations 2 oppositely disposed on the face of the disc $w$. The position of the indentations 2 is such that the pin $p$ is past the dead center in both the engaged position and in the disengaged position so that the force of the spring $r$ cannot turn the lever $f$ from either of these positions and rather tends to lock the lever $f$ in place.

The operation of the clutch is clear from the above description, it being noted that to engage the clutch, the lever $f$ is turned to the position shown in Figure 4, whereupon the clutch teeth X ride on the teeth W under the tension of the spring $r$ pressing against the pin $j$, and causing the levers $k$ to press the yoke $d$ against the movable clutch member Y. Upon rotation of the shaft H, the movable clutch member Y rotates until the teeth X come to position between the teeth W on the pinion J, whereupon, under the tension of the spring $r$ they are snapped quickly into position and to the full depth of the teeth. The tension of the spring $r$ is preferably rather strong so that the action is much more rapid than could conveniently be performed by hand. To disengage the clutch, the lever $f$ is rotated to the position shown in Figure 2. The withdrawal of the movable clutch member Y in this movement is positive since the link $g$ pulls directly and unyieldingly against the pin $j$, it not being usually desired to have a yielding connection for withdrawal or disengagement of the clutch.

I claim:

In a hoist the combination of a drive shaft, jaw clutch members on said drive shaft, a yoke for moving said jaw clutch members with respect to each other, a lever operatively associated with said yoke, a manually operable lever, a pin eccentrically mounted on said manually operable lever, a hollow link connecting said levers and provided with an elongated slot to permit relative movement therebetween, and a spring within said link normally opposing such limited movement.

In testimony whereof I have signed this specification.

CHARLES C. HANSEN.